Oct. 12, 1971   J. W. HARVEY   3,611,765
METHOD OF FORMING LOUVERS
Filed Sept. 8, 1969
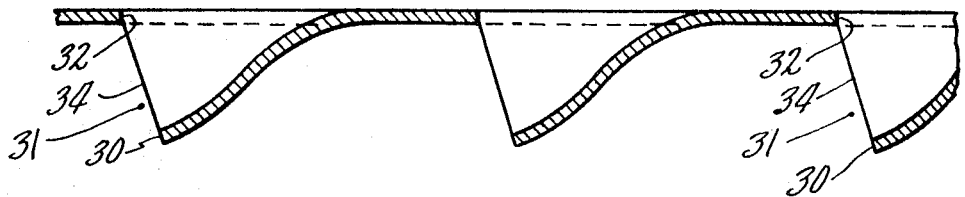
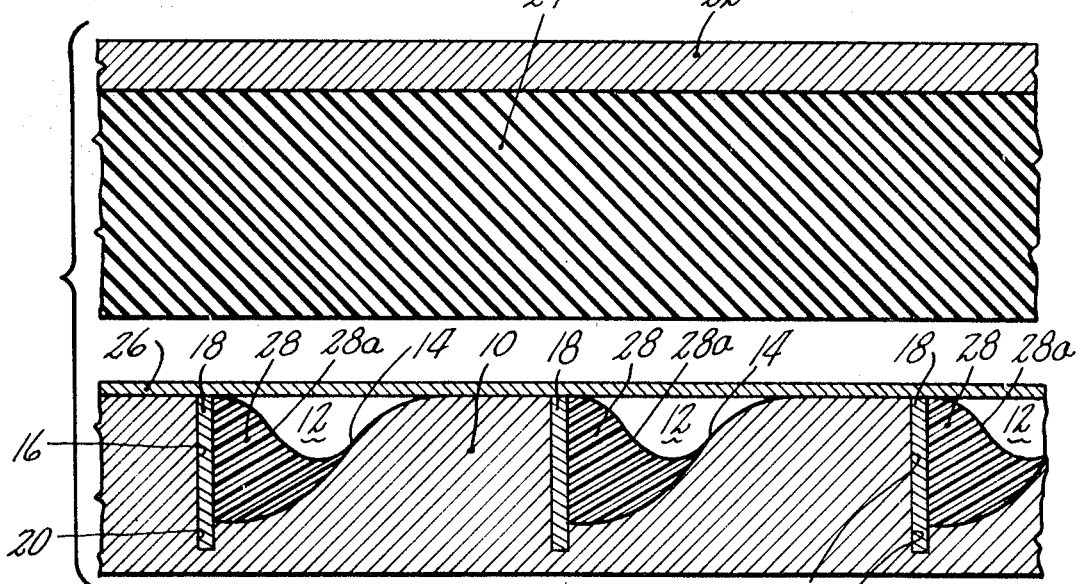
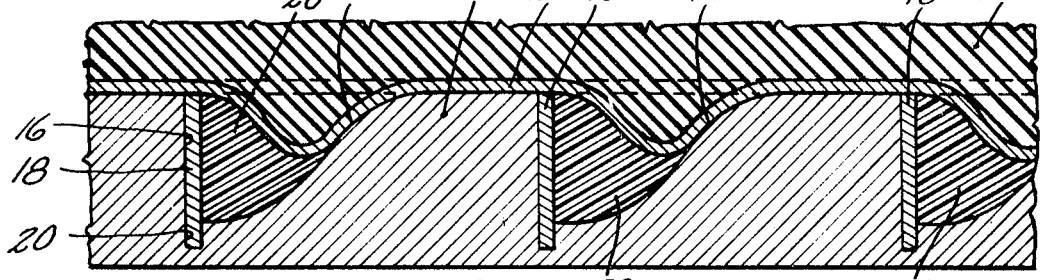
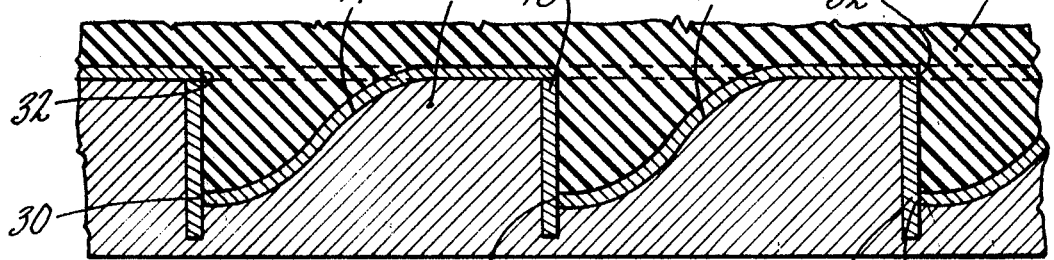
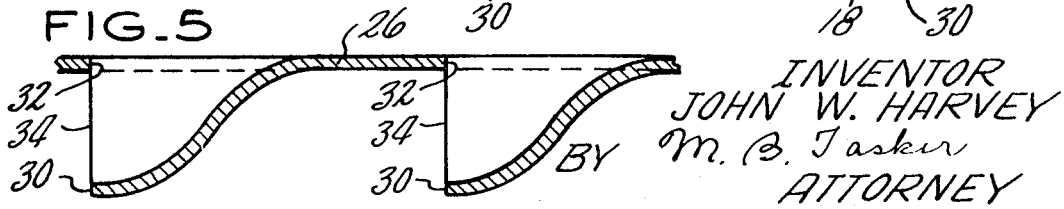
INVENTOR
JOHN W. HARVEY
BY M. B. Tasker
ATTORNEY

United States Patent Office 3,611,765
Patented Oct. 12, 1971

3,611,765
METHOD OF FORMING LOUVERS
John William Harvey, Milford, Conn., assignor to United Aircraft Corporation, East Hartford, Conn.
Filed Sept. 8, 1969, Ser. No. 855,876
Int. Cl. B21d 28/18
U.S. Cl. 72—55  4 Claims

ABSTRACT OF THE DISCLOSURE

A two-step method is provided for producing louvers by the Guerin process in which a form block having a closed-end recess with an erect shear rule therein and a resilient forming block are moved relative to each other with a sheet metal blank therebetween, including a first preforming step in which a plastic insert is placed in the recess alongside the shear rule which prevents shearing of the blank while effecting controlled stretching of the metal overlying the recess as the blank is forced into the recess by the forming block, and a second shearing and forming step performed in the same manner in the same apparatus with the plastic insert removed.

The invention described herein was made in the course of or under a contract or subcontract thereunder with the Department of the Navy.

BACKGROUND OF THE INVENTION

The present invention, which relates to an improved method for forming louvers in sheet metal, may utilize the well-known Guerin forming apparatus. Essentially the Guerin apparatus comprises a recessed form die on which the sheet metal to be formed lies. An upper pressure plate above the die is moved toward the die and carries on its confronting face a large resilient mass, typically rubber, which forces the sheet metal overlying the recess into the recess to shape and or shear the metal blank. Patent No. 2,351,475, issued June 13, 1944, to J. L. Berger, discloses an improvement on the earlier Guerin apparatus and refers to the earlier patents. The apparatus disclosed in the Berger patent is well suited for performing the method of my invention.

SUMMARY OF THE INVENTION

One object of my invention is to provide an improved method for forming louvers in a recessed form block by which a preliminary localized stretching of the metal is performed in the recess prior to shearing, followed by shearing and forming of the sheet metal blank in the same recess.

Another object of my invention is to provide a two-step method utilizing a recessed form block and a resilient forming block in which readily removable means is provided in the recess of the form block to prevent shearing of the metal in the first forming step, and is removed to permit shearing and final forming of the blank in the second step.

Yet another object of my invention is to provide an improved method for forming louvers in which a preliminary preforming operation stretches the material of the blank in the vicinity of the shaped portion to provide adequate length of louver flange when the final shearing and shaping operation is performed to provide a louver in which the bead, or edge, of the flange portion is straight out from the flat edge of the web opening to produce a louver opening through which one cannot see from a direction perpendicular to the louver surface.

Further objects and advantages of my invention will appear from the following detailed description of the drawings which show one embodiment of my invention.

BRIEF DESCRIPTION OF THE DRAWINGS

FIG. 1 is a cross sectional view through a prior art louver showing the "view through" gap resulting from the usual single step shearing and forming operation;

FIG. 2 is a fragmentary sectional view of the form block and forming member with the inserts of my invention in position in the recesses of the form block prior to the initial preforming step of my invention;

FIG. 3 shows the same apparatus at the completion of the preforming stroke of the forming member;

FIG. 4 shows the apparatus at the completion of the shearing and forming stroke of the forming member, the inserts having been previously removed from the form block recesses; and FIG. 5 shows a section through a portion of the finished louver.

DESCRIPTION OF THE PREFERRED EMBODIMENT

Referring to the drawings in which my two-step method of forming louvers is shown, 10 is a form block, or die, supported on a suitable base, not shown, having closed-end recesses 12 suitably shaped to form the flanges of a louver. The form block may be made of any suitable material, aluminum or aluminum alloy being a commonly used material. The right-hand and bottom wall 14 of the recess is shown formed with a reverse curve, although it could be straight or any other shape desired. The left-hand wall 16 is preferably vertical, although it could be inclined from the vertical. An erect steel rule insert 18 is provided in recess 12 which lies alongside the vertical wall 16 and extends into a recess 20 below the bottom of recess 12 to secure the insert 18 in position in the form block. Insert 18 terminates at its upper end flush with the flat top of form block 10. It will be understood that more than one recess 12 may be provided in the form block, three being shown herein for purposes of illustration.

The cooperating member consists of a rigid pressure plate 22 which carries on its lower face, in confronting relation to form block 10, a resilient rubber-like forming block 24. If of rubber this block may, in a typical instance, be about a foot thick and of 50–60 durometer relative hardness and of a lateral extent sufficient to overlie an area including all of the recesses 12 in form block 10. The resilient rubber forming block 24 may also be a ½" to 1" thick sheet used in a hydraulic rubber bag molding type operation in which the filling of the bag with liquid under pressure causes the pad to approach the form block in like manner as the Guerin process. The sheet metal blank 26 to be operated on lies on the flat top surface of form block 10.

In accordance with this invention a removable insert 28 is provided to fit in each recess 12 alongside the rule insert 18 which is so shaped as to completely fill that portion of the recess 12 adjacent the rule insert but has a top wall 28a which tapers off toward side wall 14 of the recess so as to intersect the latter about halfway between the bottom of the recess and the flat top of form block 10. Inserts 28 may be made of strips of plastic or any other relatively undeformable material which extends from end wall to end wall of recesses 12, the ends of the strips being shaped to conform to the end walls of recesses 12 so as to completely fill that part of the cross section of the recesses which they occupy as shown in FIG. 2. It is important to note that each plastic insert 28 is flush with the flat top surface of form block 10 and also with the top of steel rule 18 so that the shearing edge of the latter is inoperative when insert 28 is in the recess.

The method of my invention involves two distinct steps, both of which use the same form block and forming block, the first step, a preforming step, being performed with inserts 28 in place in recesses 12, whereas the second step, a shearing and forming step, is performed after inserts 28 have been removed from the recesses.

Referring to FIG. 2, wherein inserts 28 are shown in place in the recesses 12, when the forming block 24 is forced down against the sheet metal blank and form block 10, the presence of inserts 28 in the recesses prevents shearing of the sheet metal blank along the edges of rule inserts 18. The rubber block 24, however, flows under pressure into that portion of the recesses between top walls 28a of inserts 28 and walls 14 of recesses 12 forcing the sheet metal ahead of it and stretching the metal, particularly in the direction of the length of the louver flanges which are formed in the second step.

After the initial preforming (stretching) step above described, inserts 28 are removed from recesses 12 and the rubber forming block 24 is again forced against form block 10. As the rubber flows into the recesses of form block 10, shearing of the blank along the edges of rule inserts 18 takes place and the stretched portions of the blank are forced into the bottom of recesses 12 and conform to the right-hand and bottom wall 14, as shown in FIG. 4. Due to the preforming step during which the flange-forming material of the blank was stretched, the end, or bead 30 of each flange is located directly beneath the flat edge 32 of the web opening (FIG. 4). In FIG. 5 a fragmentary section of a finished louver is shown and it will be noted that there is no gap 31 (FIG. 1) between bead 30 and edge 32, as indicated by line 34 in FIGS. 1 and 5.

Attention is directed to the fact that both steps of my method are performed with the same forming apparatus, thus avoiding the use of two form blocks with the attendant registration problems.

I claim:

1. In a method of making flanged louvers by means of a form block having a recess therein and a cooperating resilient forming block, the steps of placing an insert in said recess partially filling the latter, forcing the forming block against a sheet metal blank disposed over the form block to clamp the portion of the blank surrounding the recess securely against the form block, continuing the application of compressive force against said forming block to cause the unsupported portion of said blank to be forced part way into said recess to stretch the material of the latter without shearing the blank, removing the insert, and subsequently forcing the unsupported portion of said blank all the way into said recess by means of the forcing block and shearing the blank along one edge of said recess to form the flange of the louver.

2. In a method for making flanged sheet metal louvers utilizing a form block provided with an elongated recess in a flat face thereof having a shearing edge on one long side of said recess and a cooperating forming block of resilient material, the steps of partially filling the recess with a removable insert which extends alongside the shearing edge flush with said flat face, forcing the forming block against a sheet metal blank disposed over the recess in said form block to clamp the portion of the blank surrounding said recess securely against said form block, continuing the application of compressive force against said blank to cause the unsupported portion of said blank to be forced into said recess and stretch the material of said blank, removing said insert, and again forcing said forming block against said blank to shear the latter along said long side of said recess and force the unsupported material thereof fully into said recess.

3. In a method for making flanged sheet metal louvers utilizing a form block provided with an elongated recess having a shear rule on one long edge and a cooperating forming block of resilient material, the steps of inserting a removable insert in said recess having a non-shearing edge which lies along the shearing edge of said shear rule and partially fills said recess, forcing said forming block against a sheet metal blank disposed over said recess to clamp the portion of said blank surrounding said recess securely against said form block, continuing the application of compressive force against said blank to cause the unsupported portion thereof to be forced into that portion of said recess unfilled by said insert to stretch the unsupported material of said blank, removing said insert, and again forcing said forming block against said blank to shear the same on said shear rule and force the unsupported material thereof into said recess to form a flange of the louver the sheared edge of which lies directly under the sheared edge of the web opening.

4. The method of forming a flanged louver from a sheet metal blank by means of a form block having an elongated recess in a face thereof provided with a shearing means along one of its longer edges and a cooperating resilient forming member including the steps of inserting a plastic strip in the recess in the form member which supports the blank along the shearing edge of said recess and partially fills the latter prior to an initial movement of said forming member to stretch the material of the blank, and removing the strip from said recess prior to a final shearing and shaping movement of said forming member.

References Cited

UNITED STATES PATENTS

| | | | |
|---|---|---|---|
| 801,404 | 10/1905 | Schwarz | 29—163.5 |
| 1,353,524 | 9/1920 | Fleming et al. | 72—326 |
| 2,133,445 | 10/1938 | Guerin | 72—55 |
| 2,308,998 | 1/1943 | Misfeldt | 72—55 |
| 2,377,664 | 6/1945 | Berger | 72—55 |
| 2,962,075 | 11/1960 | Warp | 72—326 |

RICHARD J. HERBST, Primary Examiner

U.S. Cl. X.R.

113—116 A